(12) United States Patent
Levi et al.

(10) Patent No.: US 7,162,368 B2
(45) Date of Patent: Jan. 9, 2007

(54) BAROMETRIC FLOOR LEVEL INDICATOR

(75) Inventors: Robert W. Levi, Fountain Valley, CA (US); Toan X. Vu, Fountain Valley, CA (US)

(73) Assignee: Honeywell International Inc., Morristown, NJ (US)

( * ) Notice: Subject to any disclaimer, the term of this patent is extended or adjusted under 35 U.S.C. 154(b) by 148 days.

(21) Appl. No.: 10/984,531

(22) Filed: Nov. 9, 2004

(65) Prior Publication Data

US 2006/0100782 A1    May 11, 2006

(51) Int. Cl.
*G01C 21/28* (2006.01)
(52) U.S. Cl. ..................... 701/300; 701/213
(58) Field of Classification Search ............ None
See application file for complete search history.

(56) References Cited

U.S. PATENT DOCUMENTS

| | | | |
|---|---|---|---|
| 4,302,973 A | 12/1981 | Yoshino et al. | |
| 4,874,063 A | 10/1989 | Taylor | |
| 5,224,059 A | 6/1993 | Nitta et al. | |
| 6,518,918 B1 | 2/2003 | Vannucci et al. | |
| 6,574,550 B1* | 6/2003 | Hashida | 701/207 |
| 6,681,176 B1* | 1/2004 | Funk et al. | 701/207 |
| 6,833,811 B1* | 12/2004 | Zeitfuss et al. | 342/357.07 |
| 6,999,780 B1* | 2/2006 | Zhao | 455/456.5 |
| 7,035,650 B1* | 4/2006 | Moskowitz et al. | 455/456.5 |
| 2005/0001720 A1* | 1/2005 | Mason et al. | 340/539.13 |

FOREIGN PATENT DOCUMENTS

JP          2002-48569        *   2/2002

* cited by examiner

*Primary Examiner*—Michael J. Zanelli

(57) ABSTRACT

The invention relates to a device, system, and method for providing a multi-mode navigation device. In a first mode of operation, the navigation device provides position information based on a radio frequency navigation signals. If radio signals become unavailable, the navigation device enters a second mode of operation. In the second mode of operation the navigation device stores the most recent elevation and associates it with a reference elevation, the reference elevation is associated with an entry floor. The difference between a current elevation and the reference elevation is determined and this difference is divided by a floor height to obtain a floor number. The navigation device provides the floor number while reliable global position information is unavailable.

21 Claims, 5 Drawing Sheets

BAROMETRIC FLOOR LEVEL INDICATOR

FIELD OF THE INVENTION

Various embodiments of the invention pertain to navigation devices. At least one embodiment of the invention pertains to a mobile navigation device that indicates to a user the current floor of a building as the user navigates the building.

DESCRIPTION OF RELATED ART

Radio frequency-based navigation devices have been used to track the position of a person or vehicle and/or inform a person or vehicle of their current location. In many instances, such navigation devices include global positioning systems (GPS), global navigation satellite systems (GNSS), compasses, inertial and other radio frequency (RF) navigation technologies.

In various applications, it may be desirable to employ a navigation device in an urban area or inside buildings where GPS is sometimes unreliable. In such operating conditions, the navigation device may not be able to determine its position.

In some implementations, it is helpful to obtain the relative and/or absolute elevation inside of a building using a navigation device. For example, a fireman entering a burning building may need to know what floor he/she is on but because of interference, may be unable to use a conventional navigation device to determine the current floor.

SUMMARY OF THE INVENTION

One embodiment of the invention relates to a device, system, and method for providing a multi-mode navigation device. In a first mode of operation, the navigation device provides position information based on RF navigation system signals. If RF position information becomes unavailable or unreliable, the navigation device enters a second mode of operation. In the second mode of operation the navigation device stores the most recent elevation obtain from a barometric altimeter and associates it with a reference elevation. The reference elevation is associated with an entry floor since the loss of RF signal generally occurs when the user enters a structure, and the RF signals are blocked or distorted. The difference between a current elevation and the reference elevation, such as the ground floor of a building, is determined and this difference is divided by a floor height. The integer value of the result of this division is determined and one is added to obtain the floor number. The navigation device provides the floor number while a reliable RF navigation device position information is unavailable.

In the second mode of operation, the navigation device further detects when new radio frequency navigation position information becomes available after a period of not receiving global position information. The navigation device keeps a count of continuous user steps since the new RF-based position information became available and while new position information remains available. The navigation device switches from the second mode to the first mode of operation and stops providing floor number information when the count of continuous user steps reaches a threshold number.

DETAILED DESCRIPTION

Methods and systems that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

In the following description, certain terminology is used to describe certain features of one or more embodiments of the invention. The term "floor" is used to indicate any surface, platform, or definite building level.

Personal navigation systems are available for use in estimating the location of a pedestrian. Such systems may utilize a global positioning system (GPS) and other RF or optical navigation technologies, as well as other sensors such as accelerometers, gyroscopes and magnetic sensors to estimate the horizontal position of the person. Accurate barometric altimeters may be incorporated into such systems to aid in providing an estimate of vertical position in conjunction with other sensors.

One embodiment of the invention pertains to a novel apparatus, system, and method utilizing a barometric altimeter to identify the floor level of a building. A barometric altimeter is employed to identify the relative and/or absolute floor level of a building.

Figure 1:
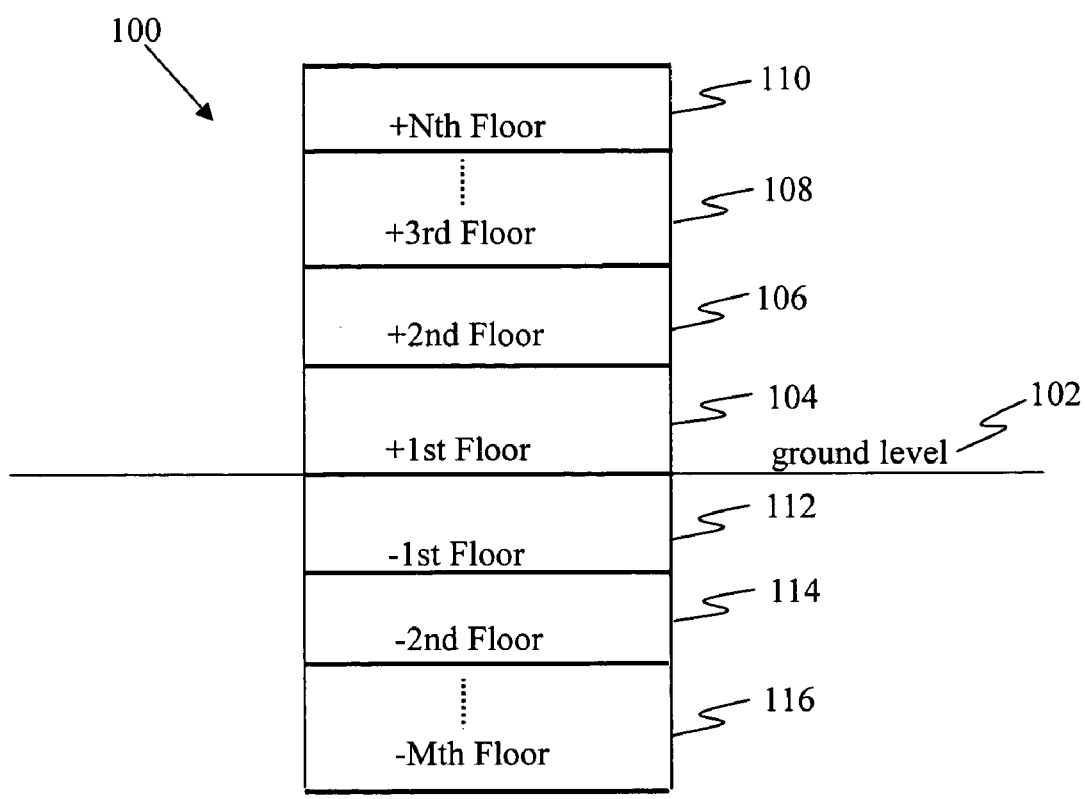
FIG. 1 illustrates a multi-story building in which a barometric floor level indicator may be used according to one embodiment of the invention.

When a person is moving inside of buildings and similar structures it is often useful to know the floor level, with respect to the ground floor for instance, at which the person is located. FIG. 1 illustrates a building or structure 100 in which a navigation device may be used according to one embodiment of the invention. Floors of the building may be designated as in integer number with appropriate plus (+) or minus (−) sign, relative to the entry floor or level 102. The entrance of a building, entry level 102, is typically considered to be the First (+1st) Floor 104. The navigation device sets the entry level 102 as the First (+1st) Floor. As the navigation device travels upward in the building, it automatically indicates the floor level of the building, e.g., Second (+2nd) Floor 106, Third (+3rd) Floor 108, and +Nth Floor 110, as it reaches the approximate elevation of such floors. If the navigation device travels downward from the entry level, then the device indicates the floor levels as Down First (−1st) Floor 112, Down Second (−2nd) Floor 114, Down −Mth Floor 116, etc.

In one mode of operation, the navigation device may indicate a floor level relative to the entry level 102. In a second mode of operation, the navigation device may be configured to set the entry level to a floor number other than the First (+1st) Floor. For example, if the navigation device enters a building at the basement, it may set the entry level as Down First (−1st) Floor.

Figure 2:
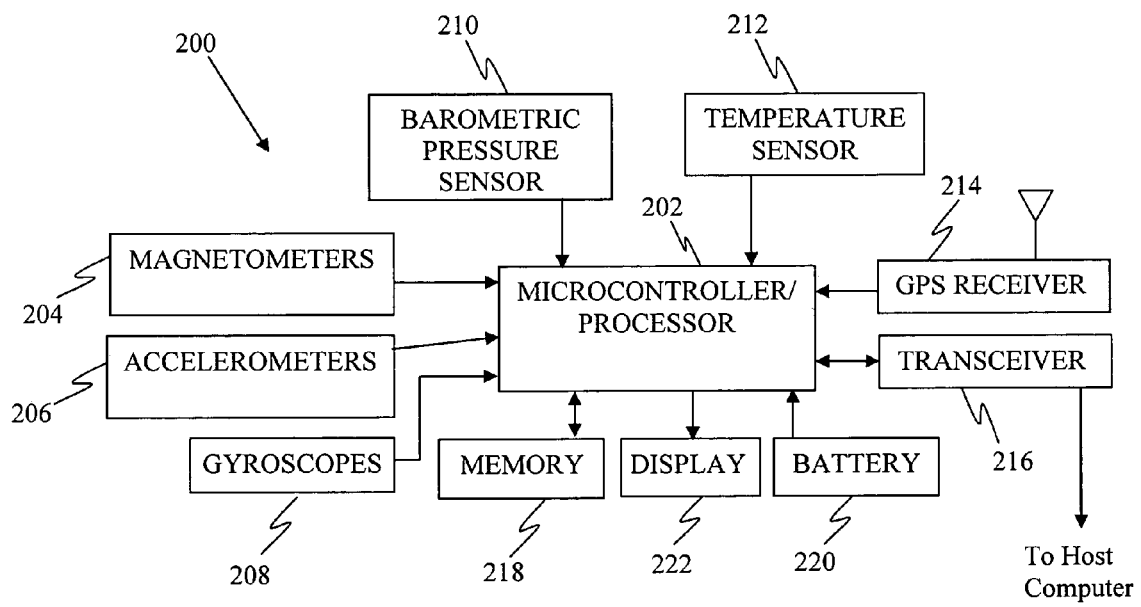
FIG. 2 is a block diagram illustrating system components of a navigation device that includes a floor level indicator according to one embodiment of the invention.

FIG. 2 is a block diagram illustrating system components of a navigation device 200 that includes a floor level indicator according to one embodiment of the invention. The navigation device 200 may include a microcontroller or processor 202 communicatively coupled to magnetometers 204 (e.g., provides magnetic field information), accelerometers 206 (e.g., provides acceleration information in three dimensions), gyroscopes 208, a barometric pressure sensor 210, and/or a temperature sensor 212 to receive signals used to provide position and/or direction information about the navigation device 200. The navigation device 200 may also include a memory/storage device 218 to store information gathered by the one or more sensors 204, 206, 208, 210, and 212 coupled to the microcontroller 202. The navigation device may also include a GPS receiver 214, to obtain positioning information, and a wireless transceiver or wired communication port 216 that can be used to communicate information to and from other devices, such as a host computer. The navigation device 200 may be powered by a power source 220, such as a battery, that permits it to be mobile. Additionally, the microcontroller 202 may be communicatively coupled to a display 222 to show navigation, position, and/or floor level information to a user.

According to one embodiment of the navigation device 200, the microcontroller 202 may be configured to process signals from its various devices and sensors and provide positional and directional information. According to one aspect of the invention, the navigation device 200 may provide, among other information, relative and/or absolute altitude information. Such altitude information may be derived from, among other signals, the barometric pressure sensor 210. According to one embodiment of the invention the barometric pressure sensor may be piezoresistive or silicon sensor providing an analog output signal corresponding to the absolute or relative pressure. For instance, the barometric pressure sensor may have an error of +/−1.5 mbar at twenty-five degrees Celsius. In one implementation of the invention, the barometric pressure sensor may be the MS5534A Barometric Module made by Intersema Sensoric SA.

In one mode of operation, if the navigation device 200 determines that signals from the GPS receiver 214 are unreliable or not available, then the navigation device 200 assumes that the user has entered a building or other structure and provides floor information. At the point where the GPS signal is lost or is determined unreliable, the navigation device 200 determines an elevation for this entry floor. The navigation device 200 refers to this floor as the reference floor (e.g., first floor). As the user carries the navigation device 200 to other floors, up or down from the reference floor, the navigation device 200 indicates the current floor on which it is located relative to the reference floor. For instance, if the user travels up fours stories from the reference floor (e.g., first floor), the navigation device 200 indicates that it has reached the fourth floor. If the user then travels down six floors or stories the navigation device 200 indicates that it has reached two stories below the reference floor.

In this mode of operation, where GPS or RF navigation signals are unavailable or unreliable, the navigation device 200 may determine the change in elevation using the barometric pressure sensor 210 readings. The microcontroller 202 may receive signals from the barometric pressure sensor 210 that may be used to indicate a change in elevation. For instance, the microcontroller 210 may convert a barometric pressure sensor signal to a corresponding elevation based on a standard or predefined conversion table of pressure to elevation. In this manner, the navigation device 200 is able to determine the elevation as the navigation device 200 moves up and down a building.

According to one embodiment of the invention, the navigation device 200 makes the floor determination process as transparent as possible to the user. If the GPS or RF navigation signal is lost or is determined to be unreliable, the microcontroller 202 determines a reference elevation from signals received from the barometric pressure sensor 210 provides a reference altitude associated with the reference floor. A nominal floor height may be preset or configured by the user and available to the navigation device 200.

As the user travel up or down a structure or building, the current floor level maybe determined by taking the difference between the current altitude and the reference altitude, and dividing the difference by the nominal floor height. The navigation device 200 then indicates the floor level. The microcontroller 202 may use different schemes to determine when a user has ascended or descended to another floor. For example, the navigation device 200 may round-off to the nearest floor and indicate that floor to user. Additionally, according to one embodiment of the invention, a hysteresis is used in determining the current floor to prevent the floor level from oscillating or changing in the presence of noise or unreliable elevation signals, such as when a user may be moving up or down a building.

The current building floor may be reset at any time when consistent position fixes can be obtained from sources such as GPS, or by a user entry. It is also known that spurious GPS signal reception may be obtained inside a building. Such spurious GPS signals can disappear quickly within a few steps. Several safeguards may be built into the logic of the navigation device 200 to prevent false or unreliable elevation fixes when the user is near a window where intermittent GPS or RF navigation signals or fixes may be obtained. For example, the microcontroller 202 may require that a minimum number of steps with valid fixes be received before relying on them to reset the current floor level indicated by the navigation device 200.

Additionally, the navigation device 200 may also detect when the user has exited the building or structure. According to one embodiment of the invention, the navigation device 200 may detect multiple exit conditions to allow multiple exits of a building on different floor levels, as well as when the user executes a quick descent/ascent maneuvers, such as rappelling down the side of a building, or is lifted off the building by helicopters.

Figure 3:
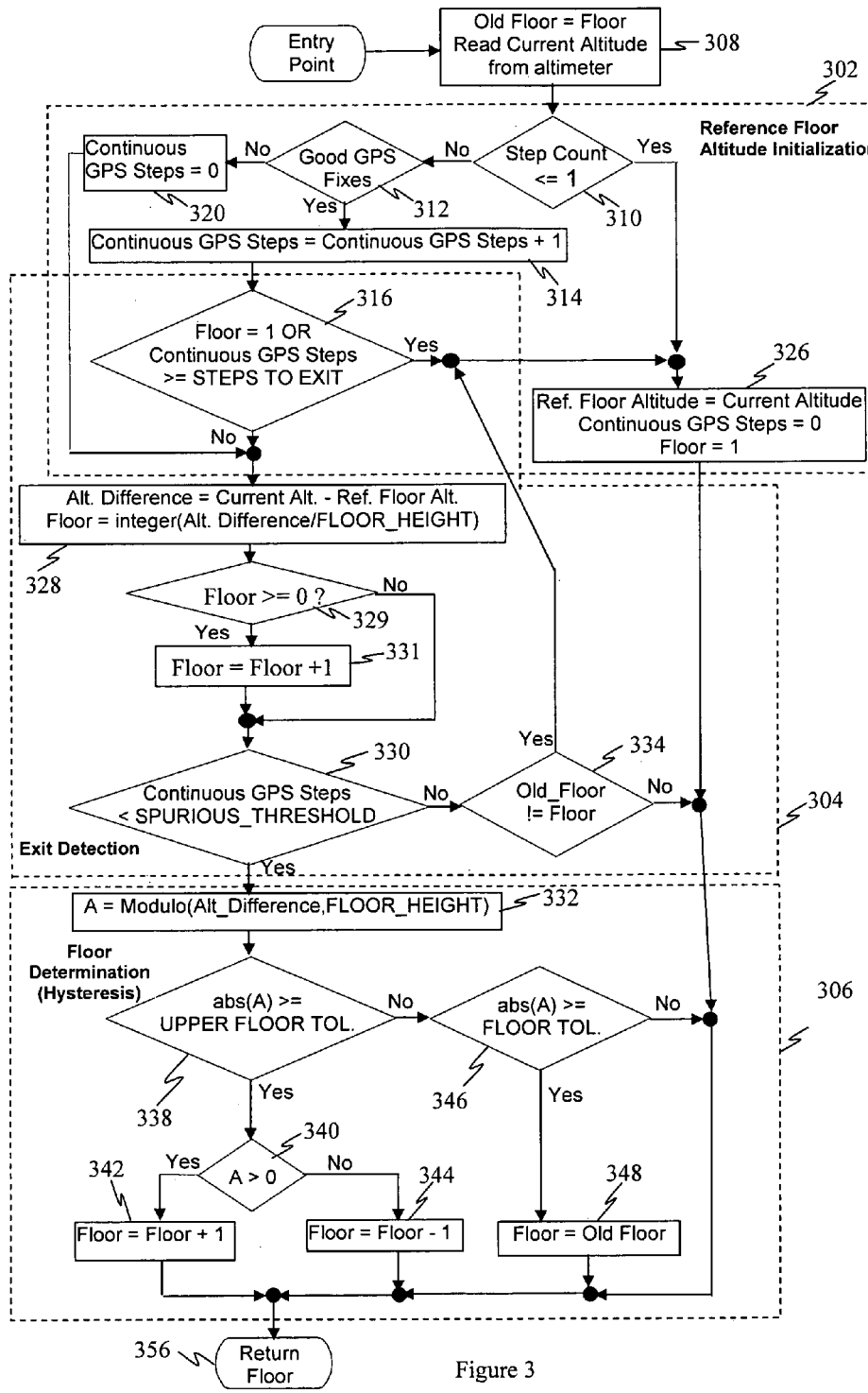
FIG. 3 a flow diagram illustrating a method by which a barometric floor level indicator may operate according to one embodiment of the invention.

FIG. 3 is a flow diagram illustrating how a navigation device determines floor levels according to one embodiment of the invention. The system is initialized with a Reference Floor Height by the user or using a default floor height. The spacing between building floors may require initialization to be representative of a particular building. Typical building floor spacing can be assumed, for example, to be ten (10) feet. However, sometimes the first floor spacing may be greater. Special floor spacing can be accommodated by the floor level quantization algorithm. By allowing the user the option of entering the floor levels manually, the floor spacing can be automatically calibrated after a few entries. Alternatively, the a default floor spacing may be programmed into the navigation device as part of the initialization routine, thus eliminating user intervention altogether.

The detailed operation of the floor determination logic can be broken down into three logical units, Reference Floor Altitude Initialization 302, Building Exit Detection 304, and a Floor Determination 306.

While in normal operation outside a building or structure, the navigation device continually or periodically reads the altitude from an altimeter and records or stores it 308. There are two ways in which the reference floor altitude is initialized, (1) when the first step is taken, even without GPS or other navigation device inputs, and (2) when GPS is available. The first method is used to initialize the reference floor altitude when the unit is initially turned ON inside a building, where GPS is not available. The navigation device keeps a record or stores the number of steps taken.

If it is the first step 310, then the floor is initially set to one (1) and the reference floor altitude is set on the first step 326. If the first step is taken inside the building, then the floor would be one (1). If the first step is taken outside the building, where GPS is available, then the subsequent steps will continuously adjust the altitude and keep the reference floor at one (1).

The second method is used when GPS is available, such as when the unit is turned ON outside the building or structure. When GPS signals are available, the reference floor altitude is continually updated until the GPS is lost, at which point the reference floor altitude will be the altimeter reading at the moment of GPS outage.

If the number of steps is greater than one 310, indicating that the user is moving, then the navigation device determines if good GPS signals or fixes are available 312. If GPS signals or fixes are good, then the Continuous GPS Steps are incremented by one (1) 314.

In the Exit Detection unit 304, the navigation device considers the possibility of two exit conditions. A first exit condition occurs when the user walks out the building, while a second exit condition occurs when the user exits rapidly (e.g., rappelling down the side of the building, or airlift from the rooftop, etc.).

The first exit condition is detected by checking for the number of steps with continuous GPS reception. The Continuous GPS Steps 314 are used to detect an exit condition 316, as when the user walks out of the building in a normal fashion. This check 316 indicates whether the user is inside or outside a building or structure. If there are GPS signals or fixes, the navigation device keeps track of the number of continuous steps taken since a GPS signal was detected 314. That is, once a GPS signal is detected, the navigation device starts a counter of continuous steps taken by the user. If a certain threshold is exceeded, then the user has walked out of the building into a clear area with good GPS reception. This check prevents spurious GPS fixes (e.g., as when the user walks near a window) from being misinterpreted. If the GPS fix 312 is not valid, then the Continuous GPS Steps are reset to zero 320, essentially restarting the detection of the exit condition. In this condition, the user is still inside the building and the floor level calculation begins 328.

The current floor is determined by first determining the altitude difference between the current altitude and the reference floor altitude (e.g., entry floor). This altitude difference is then divided by the defined floor height and the integer of this result is taken 328. The integer operation (i.e., c=int(a/b) ) is just the whole part of a/b. For example, int(5/2)=2. If the resulting current floor is greater than or equal to zero 329, one is added to the current floor 331 before proceeding to the second exit condition 330. Otherwise, the process continues to the second exit condition 330. This check 229 and operation 331 are performed so that if the current floor is one (1) and the user descends one floor, the current floor becomes minus one (−1) and not zero.

The second exit condition occurs when the continuous GPS signals are greater than a threshold number (e.g., SPURIOUS_THRESHOLD), indicating a exit at a different floor than the entry floor 330. For example, the invention considers the condition when a user is near a window when he exits a building either by being airlifted or rappelling down the building. While good GPS fixes are detected, the system compares the number of Continuous GPS Steps to a SPURIOUS_THRESHOLD to determine if it is a good indicator 330. In this case, the user does not take the number of steps set by STEPS TO EXIT, but a floor change is detected 334. The SPURIOUS_THRESHOLD value may be set to prevent spurious GPS reception near a window triggering a false exit condition.

The Floor Determination unit 306 implements a hysteresis to prevent the floor level from oscillating in the presence of noise. First, the modulo of the Altitude Difference and nominal FLOOR HEIGHT is performed. The modulo of the Altitude Difference and FLOOR HEIGHT is taken. The modulo operation is as follows: c=modulo(a,b) is equivalent to c=a−b*fix(a/b); where fix is a round towards zero (0). For example, fix(4.7)=4; fix(−4.7)=−4. Therefore, the modulo operation is just the remainder of the division operation. In this case, it is an indication of the relative distance from the current floor level. For example, assuming a floor separation of three (3) meters, and the difference between the current altitude and the reference floor altitude is at 28 meters, Floor=Integer(28/3)+1 (Ground floor is 1)=10. Remainder=modulo(28,3)=28−3*fix(28/3)=28−3*9=1.

If the altitude is UPPER FLOOR TOL above the current floor, the floor indicator will increase the floor count 342. If the altitude is UPPER FLOOR TOL below the current floor, the floor indicator will decrease the floor count 344. When it is in between, then the floor count remains the same 348. This scheme used to combat situations where the user is between floors, or the noise from the altimeter reading may cause the floor level to jump. This is referred to as the hysteresis. The whole purpose of the modulo operation is to get the difference in altitude change from the current floor level to determine whether a floor change has taken place, at the same time, preventing the altimeter noise from triggering a false floor level change. A person of ordinary skill in the art will realize that such scheme may be implemement in various ways without departing from the invention.

The resulting floor number is then returned to the user 356.

According to various embodiments of the invention, the method described in FIG. 3 may be performed in hardware, software, or a combination of the two.

Figure 4:
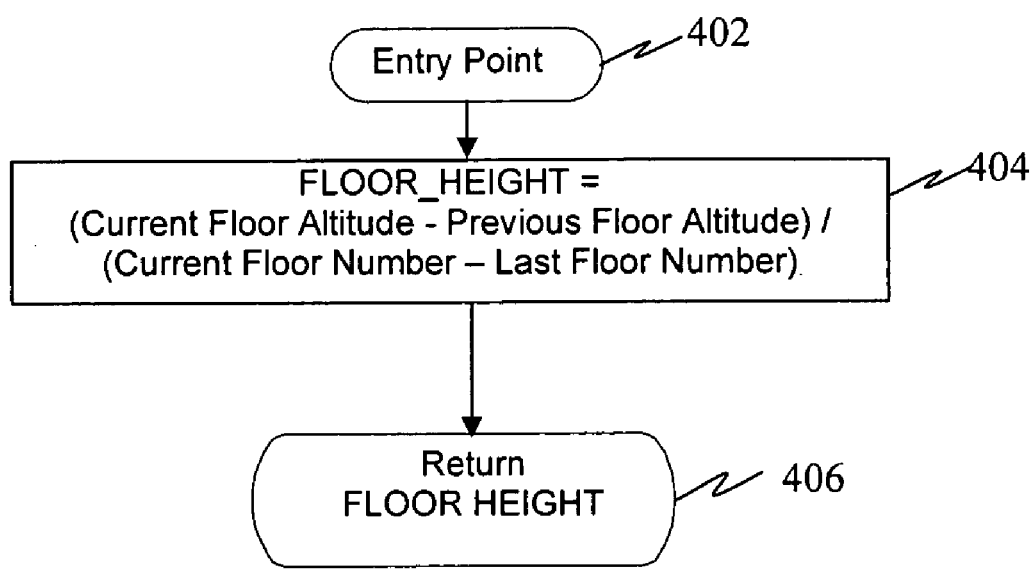
FIG. 4 is a flow diagram illustrating how floor information may be initialized into the navigation device according to one embodiment of the invention.

FIG. 4 is a flow diagram illustrating how floor information may be initialized on the navigation device according to one embodiment of the invention. To initialize the navigation device, the user indicates to the system when two sequential floors are crossed. For example, the user may inform the navigation device that it is currently at the reference floor and then indicate when it crosses the next floor (i.e., up one floor or down one floor from the reference floor). As the user indicates a first floor and a sequential second floor, the navigation device notes the altitude at the first floor and second floor and calculates the height difference based on the barometric readings at each floor. This indication of two sequential floors permits the navigation device to determine the height between floors by calculating the difference between the current floor altitude and the previous floor altitude and dividing it by the difference between the current floor number and the previous floor number 404. The floor height is then returned 406 and can be used by the navigation device to more accurately provide floor information. The scheme described above is merely exemplary and other manual and/or automatic schemes to determine the distance between floors may be implemented without departing from the invention.

Figure 5:
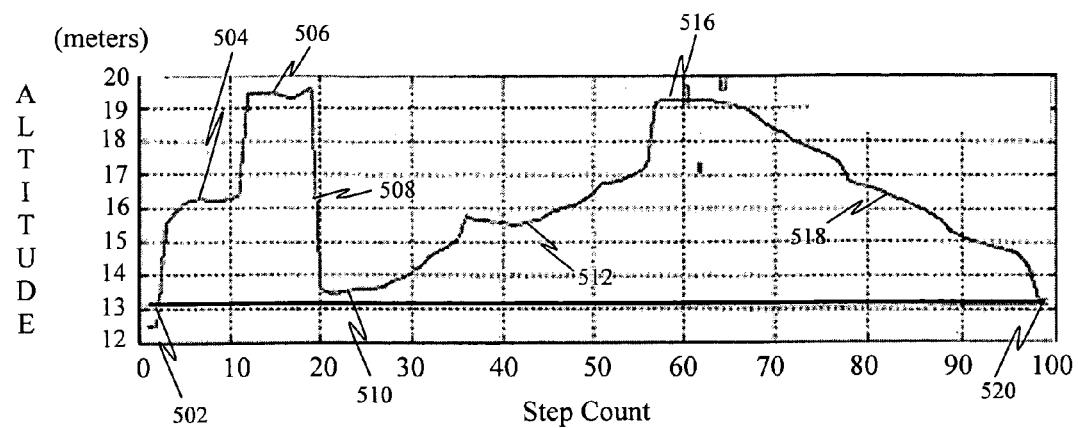
FIGS. 5 and 6 illustrate the data collected by an altimeter and the indicated floor as a user travels up and down a building according to one embodiment of the invention.
Figure 6:
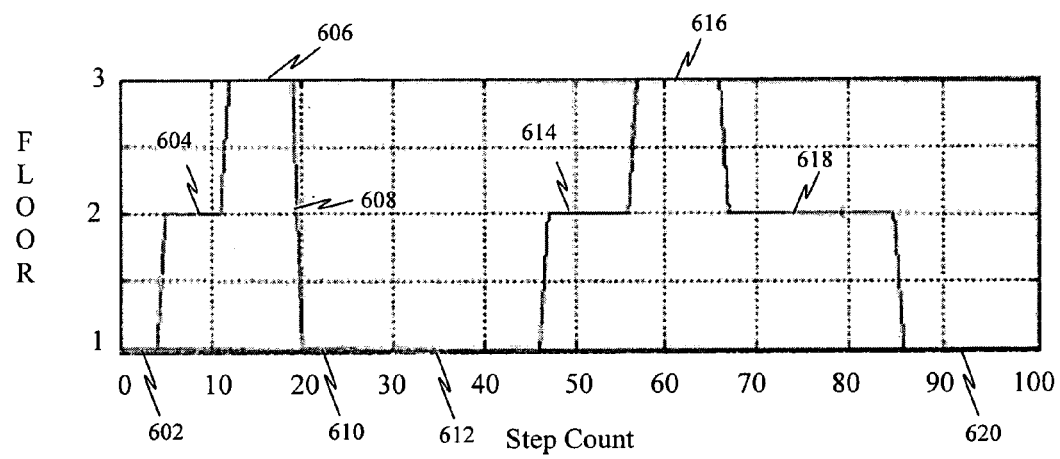

FIGS. 5 and 6 illustrate the data collected by an altimeter and the indicated floor as a user travels up and down a building according to one embodiment of the invention. The user enters a building at around thirteen meters in altitude 502 and the navigation device associates this with the reference floor 602 (e.g., entry floor). This reference floor is indicated as floor one (1). As the user takes an elevator to the next floor up, the altimeter indicates the change in altitude 504 and the floor indicator changes to floor two (2) 604. After taking a few steps, the user continuous his ride up the elevator to the next floor up. The elevator stops on the third floor 506, and the floor indicator shows floor three (3) 606. The user then rides the elevator down to the reference floor (e.g., entry floor) 610. Note that during the elevator descend 508 the floor indicator does not show the continuous transition 608 but only indicates exact floor numbers.

Upon reaching elevation 510, approximately the reference floor elevation, the user then takes stairs up the building. As the user climbs the stairs 512, the floor indicator does not change except when a particular floor 614 and 616 is reached. The user walks to the third floor 516 and the floor indicator 616 indicates the third floor 616. The user then walks down the stairs 518. Soon after the user moves below the third floor elevation the indicator shows floor two 618. After the user travels below the second floor elevation the floor indicator shows the first floor 620. The user then reaches the reference floor elevation 520.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A navigation device for providing a floor number of a structure, comprising:
   a radio frequency navigation receiver providing position information;
   an altimeter providing elevation information; and
   a processor communicatively coupled to the radio frequency navigation receiver to receive the position information and communicatively coupled to the altimeter to receive elevation information, the processor configured to
      detect if radio frequency navigation receiver has stopped providing reliable position information,
      if it is determined that the radio frequency navigation receiver has stopped providing reliable position information, the processor
         stores the most recent elevation information from the altimeter and associates it as a reference elevation,
         associates the reference elevation with an entry floor,
         monitors the altimeter information for a current elevation,
         determines a change in elevation between the current elevation and the reference elevation,
         divides the change in elevation by a nominal floor height to determine a floor number, and
         provides the floor number to a user.

2. The navigation device of claim 1 wherein the entry floor is floor one and floor numbers are defined relative to the entry floor.

3. The navigation device of claim 1 wherein processor determines a floor number by
   dividing the change in elevation by the nominal floor height and taking the integer value of the result.

4. The navigation device of claim 1 wherein processor determines whether the change in elevation between the current elevation and the reference elevation is within a threshold limit of a particular floor number.

5. The navigation device of claim 1 wherein processor determines the floor number by
   taking the modulo function of the change in elevation and the nominal floor height.

6. The navigation device of claim 1 wherein the nominal floor height may be user defined or preconfigured.

7. The navigation device of claim 6 wherein a floor height for a particular floor may be defined as a different height than the nominal floor height.

8. The navigation device of claim 1 wherein the number of the entry floor may be user defined and other floor numbers are defined relative to the entry floor number.

9. The navigation device of claim 1 wherein the processor is further configured to ignore spurious position information from the radio frequency navigation receiver.

10. The navigation device of claim 1 wherein the processor is further configured to
    distinguish the difference between reliable position information and unreliable position information, and
    cease providing floor number information when reliable position information is obtained.

11. The navigation device of claim 10 wherein distinguishing reliable position information and unreliable position information includes
    detecting when new position information becomes available after a period of not receiving position information,
    keeping a count of continuous user steps since the new position information became available and while new position information remains available,
    ceasing to provide floor number information when the count of continuous user steps reaches a threshold number.

12. The navigation device of claim 11 wherein the count of continuous user steps is reset to zero if new position information is not received from the radio frequency navigation receiver.

13. The navigation device of claim 1 wherein the nominal floor height is determined by detection of the height difference between two sequential floors.

14. A method for providing a floor number of a structure, comprising:
- detecting whether global position information becomes unavailable;
- if global position information is unavailable, then
  - storing the most recent elevation and associating it with a reference elevation;
  - associating the reference elevation with an entry floor;
  - determining a change in elevation between a current elevation and the reference elevation;
  - dividing the change in elevation by a floor height to determine a floor number relative to the entry floor; and
  - providing the floor number to a user while reliable global position information is unavailable.

15. The method of claim 14 further comprising:
- ceasing to provide floor number information when reliable position information is obtained.

16. The method of claim 14 further comprising:
- detecting when new global position information becomes available after a period of not receiving global position information;
- keeping a count of continuous user steps since the new global position information became available and while new position information remains available; and
- ceasing to provide floor number information when the count of continuous user steps reaches a threshold number.

17. The method of claim 14 further comprising:
- taking the integer value of the result of dividing the change in elevation by a floor height and adding one to obtain the floor number.

18. A machine-readable medium comprising at least one instruction to provide floor number information of a structure if global positioning system information is unavailable, which when executed by a processor, causes the processor to perform operations comprising:
- detecting whether global position information becomes unavailable;
- if global position information is unavailable, then
  - associating the most recent elevation with a reference elevation;
  - determining a change in elevation between a current elevation and the reference elevation;
  - dividing the change in elevation by a floor height to determine a floor number relative to the reference elevation; and
  - providing the floor number to a user while reliable global position information is unavailable.

19. The machine-readable medium of claim 18 further comprising:
- ceasing to provide floor number information when reliable position information is obtained.

20. The machine-readable medium of claim 18 further comprising:
- detecting when new global position information becomes available after a period of not receiving global position information,
- keeping a count of continuous user steps since the new global position information became available and while new position information remains available, and
- ceasing to provide floor number information when the count of continuous user steps reaches a threshold number.

21. The machine-readable medium of claim 20 further comprising:
- taking the integer value of the result of dividing the change in elevation by a floor height and adding one to obtain the floor number.

* * * * *